2,911,404

18,20-EPOXY-20,21-DIHYDROXY-4-PREGNEN-3-ONES, ETHERS AND ESTERS THEREOF

Raphael Pappo, Skokie, Ill., assignor to G. D. Searle & Co., Chicago, Ill., a corporation of Delaware No Drawing. Application December 15, 1958
Serial No. 780,253

10 Claims. (Cl. 260—239.55)

The present invention relates to a new group of 18,20-epoxy steroids and, more particularly to 18,20-epoxy-20,21-dihydroxy-4-pregnen-3-one and ethers and esters thereof. The compounds which constitute this invention can be represented by the general structural formula

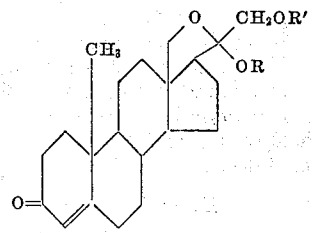

wherein R is a hydrogen, lower alkyl or lower alkanoyloxy group and wherein R' is either a hydrogen or lower alkanoyloxy group. In the foregoing structural formula R can represent such lower alkyl groups as methyl, ethyl, straight-chain or branched propyl, butyl, amyl and hexyl. The radicals R and R' can also represent structures of the type (lower alkyl)-CO wherein the lower alkyl group has the meaning given hereinabove.

These compounds are sodium retaining agents and are active in the prevention of experimental stress.

A convenient starting material for these compounds is 18,20 - epoxy - 21- dimethylamino - 4- pregnen - 3- one. Treatment with a peroxy acid yields an N-oxide which on heating forms 18,20-epoxy-4,20-pregnadien-3-one. The relatively crude dienic product thus obtained is suitable for the following oxidation reactions. Oxidation with osmium tetroxide yields the mixture of the 20α and 20β-epimers of 18,20-epoxy-20,21-dihydroxy-4-pregnen-3-one. The latter can be acylated to form the 21-mono esters of the general formula

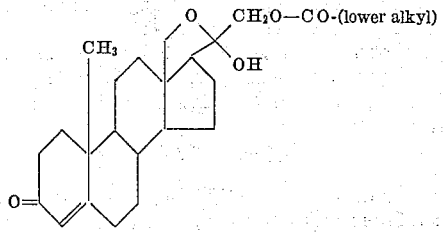

It can also be etherified in the 20-position to form the 20-mono ethers.

Crude 18,20-epoxy-4,20-pregnadien-3-one, on treatment with a lead tetraalkanoate, yields the 20,21-diesters of 18,20-epoxy-20,21-dihydroxy-4-pregnen-3-one of the structural formula

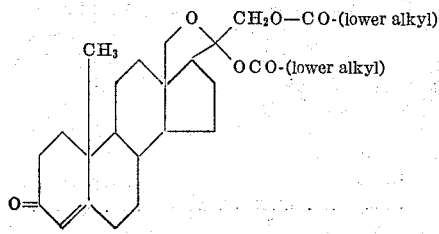

The 20-ether-21-esters of the type

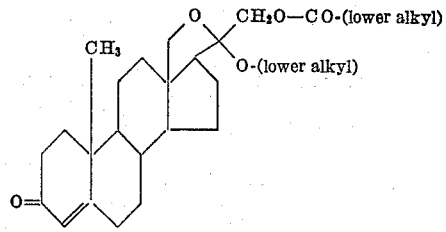

can be prepared either by etherifying the 18,20-epoxy-20-hydroxy-21-acyloxy-4-pregnen-3-ones or esterifying with alkanoic anhydrides the 18,20-epoxy-20-alkoxy-21-hydroxy-4-pregnen-3-ones.

The compounds which constitute this invention will appear in further detail from the following examples which are given for the purpose of illustration only and are not to be construed as limiting the invention in spirit or in scope. In these examples quantities are indicated as parts by weight.

Example 1

By the procedure of Examples 11 and 12 of my copending application Serial No. 758,920, filed September 4, 1958, 2 parts of 18,20-epoxy-21-dimethylamino-4-pregnen-3-one are converted to 18,20-epoxy-4,20-pregnadien-3-one which is then dissolved in 50 parts of pyridine and treated at 0° C. with 1.57 parts of osmium tetroxide in 5 parts of pyridine. The mixture is stirred at room temperature for 5 hours and treated with a solution of 7 parts of sodium bisulfite, 50 parts of water and 5 parts of pyridine. Stirring is continued for 30 minutes after which the product is extracted from benzene and the extracts are washed successively with water, cold hydrochloric acid, water, aqueous sodium hydroxide, water and dried. The residue is applied in benzene solution to a chromatography column containing a mixture of 15% magnesia and 85% silica. The column is developed with benzene solutions containing increasing concentrations of ethyl acetate. Elution with a 20% solution of ethyl acetate in benzene yields 18,20-epoxy-20,21-dihydroxy-4-pregnen-3-one which, on recrystallization from acetone and then from ethanol containing a small amount of pyridine, is obtained in prisms melting at about 175–180° C. with decomposition. The recrystallized product from acetone has infrared maxima in potassium bromide at 2.89, 3.41, 3.49, 6.00, 6.21, 9.50, 10.54, 10.89, and 11.51 microns. When this pure compound is recrystallized from ethanol the infrared absorption spectrum changes and becomes identical with that of the products obtained in Example 2. This product is extremely sensitive to traces of acid and even in dilute aqueous acids is converted in a few minutes to a non-hydroxylic dimer.

Example 2

18,20-epoxy-4,20-pregnadien-3-one is prepared as in the preceding example and dissolved in 50 parts of dioxane. This solution is treated successively with 0.8 part of pyridine and then with 1.7 parts of osmium tetroxide in 10 parts of dioxane. The mixture is allowed to stand at room temperature for 12 hours and is then stirred for 24 hours with a solution of 4 parts of sodium sulfite and 30 parts of water. The brown suspension is filtered and the precipitate is washed with dioxane. The combined filtrate and washings are taken up in 450 parts of benzene and the solution is washed with ether and cooled to 5° C. It is next washed rapidly with several portions of cold 0.1 N aqueous hydrochloric acid and then successively with water, aqueous sodium hydroxide, and water and taken to dryness under vacuum. The crude 18,20-epoxy-20,21-dihydroxy-4-pregnen-3-one is triturated with acetone, filtered, washed with acetone and dried to yield crystals of 18,20-epoxy-20,21-dihydroxy-4-pregnen-3-one melting at about 191–195° C. with decomposition. Infrared maxima are observed at 2.90, 3.41, 3.49, 6.00, 6.20, 9.50, 10.90 and 11.51 microns. This product is apparently the 20-epimer of the product of the preceding example. One recrystallization from ethanol containing a trace of pyridine brings the melting point down to about 186–190°, and another recrystallization reduces it to 181–185° C. This process shows that slow interconversion of the high melting to the low melting isomer takes place.

The acetone filtrate and washings are concentrated to dryness under nitrogen and triturated with ether to yield crystals melting at 175–176° C. with decomposition and on further recrystallization from butanone containing a trace of pyridine crystals are obtained melting at about 168–170° C. The two forms had identical infrared spectra.

*Example 3*

A suspension of 66 parts of 18,20-epoxy-20,21-dihydroxy-4-pregnen-3-one (melting at about 186–190° C. as obtained in Example 2) in 300 parts of pyridine is stirred with 6 parts of acetic anhydride for 10 hours, diluted with 6 parts of water, and stirred for 10 minutes longer. It is then diluted with a 1:1 mixture of ether in benzene, washed successively with water, 0.1 N aqueous hydrochloric acid, water, aqueous potassium bicarbonate, water and dried. The solvent is removed under reduced pressure and the residue is crystallized from a 10:1 mixture of ether and benzene to yield 18,20-epoxy-20-hydroxy-21-acetoxy-4-pregnen-3-one melting at 155–158° C. The mother liquors contain the other 20-epimer.

A similar treatment of the 18,20-epoxy-20,21-dihydroxy-4-pregnen-3-one as obtained in Example 1 melting at about 175–176° C. yields crystals of 18,20-epoxy-20-hydroxy-21-acetoxy-4-pregnen-3-one melting at about 158–159° C. The infrared spectra of both of these monoacetates is identical; maxima are observed at 2.90, 3.40, 3.49, 5.77, 5.99, 6.22, 8.00, 9.55, 11.05 and 11.57 microns.

*Example 4*

A suspension of 18,20-epoxy-20,21-dihydroxy-4-pregnen-3-one (melting at about 186–190° C.) in 100 parts of pyridine and 2 parts of propionic anhydride is stored at room temperature for 10 hours and then diluted with 2 parts of water. The mixture is stirred for 10 minutes and then diluted with a 1:1 mixture of ether in benzene. This mixture is washed successively with water, 0.1-N aqueous hydrochloric acid, water, aqueous sodium carbonate, water and dried. The solvent is removed under pressure and there is thus obtained as a residue an oily mixture of the two 20-epimers of 18,20-epoxy-20-hydroxy-21-propionoxy-4-pregnen-3-one. The infrared absorption spectrum shows maxima at 3.41, 3.49, 5.75, 6.00, 6.20, 8.08 and 11.50 microns.

*Example 5*

A solution of 562 parts of 18,20-epoxy-4,20-pregnadien-3-one in 3500 parts of benzene is treated with 1633 parts of lead tetraacetate in 4,500 parts of benzene. A gummy precipitate of lead diacetate forms immediately. The mixture is stirred at room temperature for an hour and then diluted with water. After 10 additional minutes of stirring the mixture is filtered and the precipitate is washed with benzene. The combined filtrate and washings are diluted with ether and washed successively with aqueous sulfuric acid, water, 5% aqueous potassium bicarbonate and water and dried. The solvent is removed under nitrogen on a steam bath to yield a gum which consists of the 20α and 20β-epimers of 18,20-epoxy-20,21-diacetoxy-4-pregnen-3-one. Infrared maxima are observed at 3.41, 3.49, 5.71, 5.99, 6.19, 8.10, 9.65 and 11.55 microns.

*Example 6*

Lead tetrapropionate is prepared by dissolving lead tetraacetate in propionic acid and allowing lead tetrapropionate to precipitate in the course of 20 minutes. The resulting product is collected on a filter, washed with propionic acid and used immediately. A solution of 500 parts of the crude 18,20-epoxy-4,20-pregnadien-3-one in 6,000 parts of acid-free chloroform is added to a suspension of 16,000 parts of lead tetrapropionate in 6,000 parts of chloroform at 0° C. The mixture is stirred for 15 minutes at room temperature and then worked up as in the preceding example to yield the oily mixture of the 20α and 20β-epimers of 18,20-epoxy-20,21-dipropionoxy-4-pregnen-3-one.

*Example 7*

A solution of 130 parts of 18,20-epoxy-20,21-dihydroxy-4-pregnen-3-one (using either of the epimers obtained in Examples 1 and 2) in 8,000 parts of methanol is stirred for 10 hours at room teperature with 15 parts of p-toluenesulfonic acid monohydrate. Within a few minutes a precipitate forms which consists of a dimer. After standing at room temperature for 10 hours the liquid portion is separated, rendered alkaline with potassium carbonate and extracted with ether. The extract is dried and taken to dryness under nitrogen to yield an amorphous mixture of 18,20-epoxy-20-methoxy-21-hydroxy-4-pregnen-3-one.

*Example 8*

The mixture of 20-epimers of 18,20-epoxy-20-methoxy-21-hydroxy-4-pregnen-3-one obtained in the preceding example, and 1 part of acetic anhydride in 5 parts of pyridine is maintained for 10 hours at room temperature after which it is poured over 5% aqueous potassium bicarbonate, shaken for 5 minutes and extracted with benzene. The extract is taken to dryness to yield a gum. Upon recrystallization from ether there is obtained 18,20-epoxy-20-methoxy-21-acetoxy-4-pregnen-3-one melting at about 144–149° C.

*Example 9*

A solution of 80 parts of the crude epimeric mixture of 18,20-epoxy-20-hydroxy-21-acetoxy-4-pregnen-3-one obtained in Example 3 in 2,400 parts of methanol is treated with 1 part of p-toluenesulfonic acid monohydrate and maintained at room temperature for 15 hours. It is then diluted with benzene, washed with 5% aqueous potassium bicarbonate, water and dried and evaporated to dryness under nitrogen. The residue is recrystallized from ether to yield elongated prisms melting at about 149–154° C. The 18,20-epoxy-20-methoxy-21-acetoxy-4-pregnen-3-one thus obtained has the same infrared spectrum as that of the preceding examples, maxima being observed at 3.41, 3.49, 5.79, 5.96, 6.21, 8.00, 9.46, and 11.33 microns.

*Example 10*

A solution of 10 parts of 18,20-epoxy-20,21-dihydroxy-4-pregnen-3-one in 1000 parts of butanol is treated with 1 part of p-toluenesulfonic acid monohydrate and permitted to stand at room temperature for 15 hours. The liquid portion of the mixture is separated, rendered alkaline with sodium carbonate and extratced with ether. This extract is dried and taken to dryness under vacuum to yield an amorphous mixture of the epimers of 18,20-epoxy-20-butoxy-21-hydroxy-4-pregnen-3-one.

This mixture of 20α and 20β epimers is treated with 100 parts of pyridine and 1 part of butyric anhydride and permitted to stand at room temperature for 10 hours. It is then poured over 5% aqueous potassium carbonate, shaken and extracted with benzene. On concentration of the benzene solution there is obtained a gummy mixture of the epimers of 18,20-epoxy-20-butoxy-21-butyroxy-4-pregnen-3-one. The infrared absorption spectrum shows maxima at 3.41, 3.49, 5.80, 5.97, 6.21, 8.06, 11.50 microns.

What is claimed is:

1. A compound of the structural formula

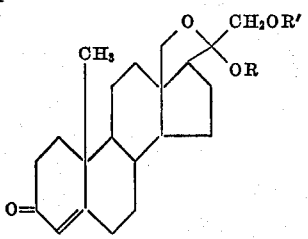

wherein R is a member of the class consisting of hydrogen, lower alkyl and (lower alkyl)-CO and R' is a member of the class consisting of hydrogen and (lower alkyl)-CO group.

2. 18,20-epoxy-20,21-dihydroxy-4-pregnen-3-one.
3. A compound of the structural formula

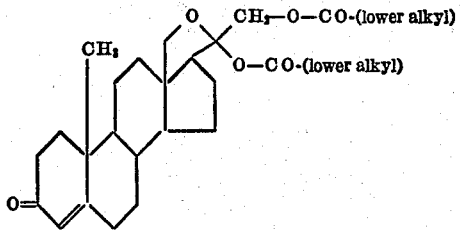

4. 18,20-epoxy-20,21-diacetoxy-4-pregnen-3-one.
5. A compound of the structural formula

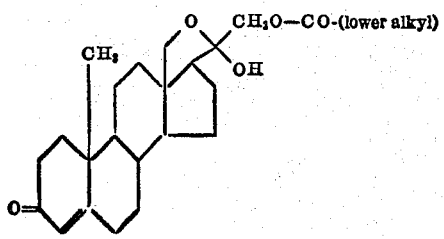

6. 18,20-epoxy-20-hydroxy-21-acetoxy-4-pregnen-3-one.
7. A compound of the structural formula

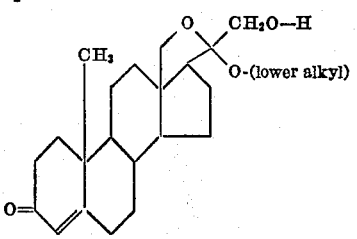

8. 18,20 - epoxy - 20 - methoxy - 21 - hydroxy - 4 - pregnen-3-one.
9. A compound of the structural formula

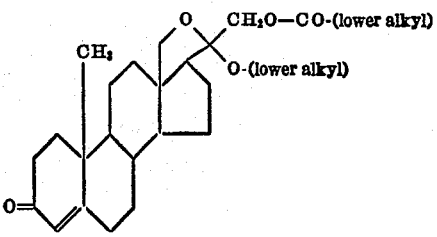

10. 18,20 - epoxy - 20 - methoxy - 21 - acetoxy - 4 - pregnen-3-one.

No references cited.